Oct. 8, 1968          R. W. LAKIN          3,405,274
DOSIMETER INCORPORATING AN ELECTRO-CHEMICAL INTEGRATING DEVICE
Filed Oct. 17, 1966                2 Sheets-Sheet 1
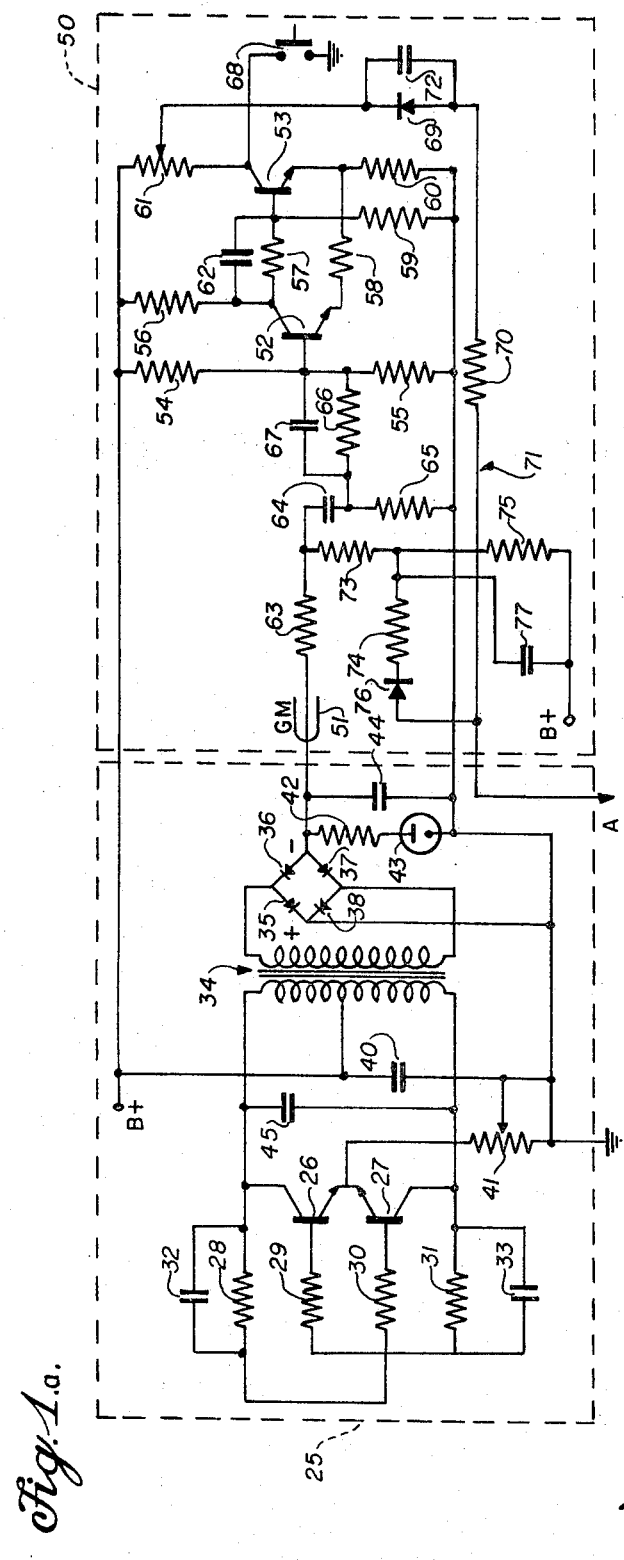
Fig. 1.a.
INVENTOR.
ROGER W. LAKIN
BY
ATTORNEY Oct. 8, 1968   R. W. LAKIN   3,405,274
DOSIMETER INCORPORATING AN ELECTRO-CHEMICAL INTEGRATING DEVICE
Filed Oct. 17, 1966   2 Sheets-Sheet 2
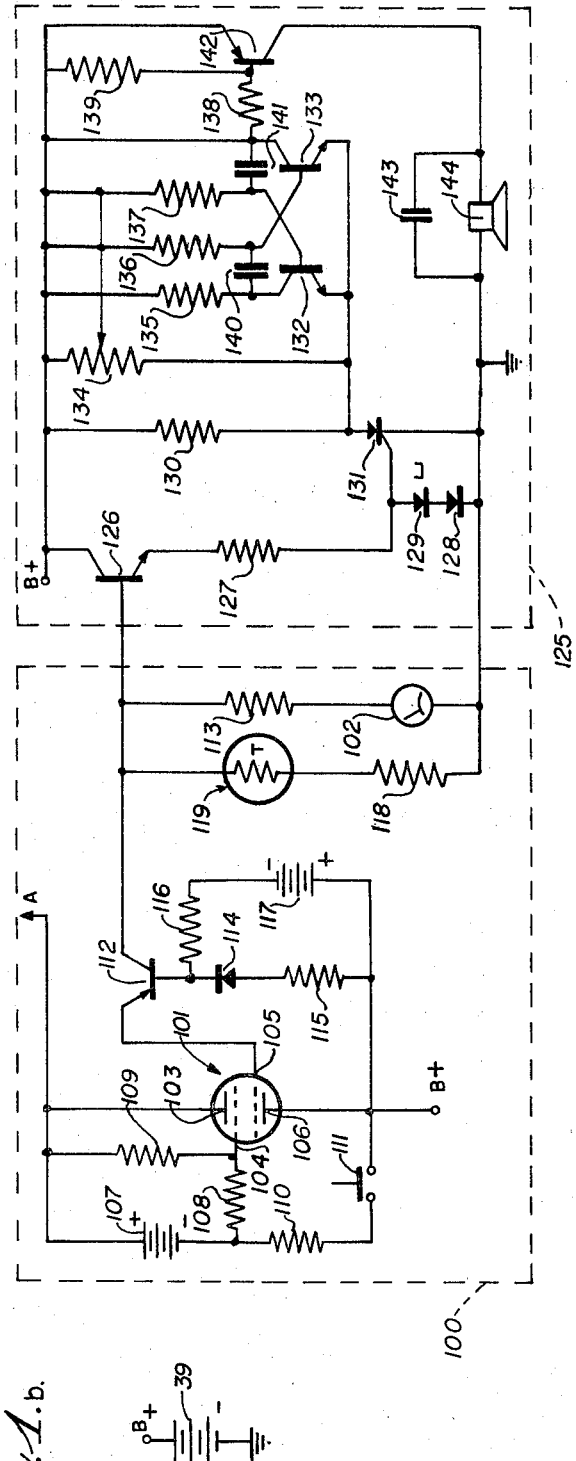
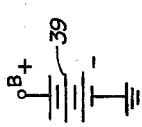
Fig. 1.b.
INVENTOR.
ROGER W. LAKIN
BY
ATTORNEY

United States Patent Office 3,405,274
Patented Oct. 8, 1968

3,405,274
DOSIMETER INCORPORATING AN ELECTRO-CHEMICAL INTEGRATING DEVICE
Roger W. Lakin, Livermore, Calif., assignor to the United States of America as represented by the United States Atomic Energy Commission
Filed Oct. 17, 1966, Ser. No. 588,267
5 Claims. (Cl. 250—83.6)

The invention described herein was made in the course of, or under a contract with the United States Atomic Energy Commission.

This invention relates to radiation dosimetry, and more particularly to a dosimeter in which radiation dosage is detected by an electronic nuclear counter and a total dosage indication is accumulated in analog form in an electro-chemical integrating device.

Numerous electrically operated dosimeter units have been developed. Many utilize various detectors which indicate individual radiation events by providing a quantized electrical signal output pulse, and a variety of summing devices have been used to indicate the total number of events. One category of prior art devices incorporates a capacitive storage unit in which the total charge present on the capacitor is functionally dependent on the total number of accumulated radiation events, i.e., dose. The inherent deficiency of this design follows the finite leakage of the charge associated with the capacitor, limiting the time duration over which radiation dosage indicating potentials may be accurately accumulated. Another class of conventional dosimeter designs utilizes electronic or mechanical analog or digital counters arranged to sequentially increase in count in response to scaled output signals from an electronic rediation detector or counter. Although this latter category of dosimeters does not have the disadvantages attendant in the use of capacitive storage accumulators, the counting units connected therewith generally necessitate complex circuitry and bulky power supplies. Furthermore, conventional dosimeters employing Geiger-Muller counter tubes are limited in response and accuracy due to a fall off in the rate of pulse signal output relative to dosage rate for high rates of incident radiation.

Accordingly, it is a general object of the invention to provide an improved electronic dosimeter capable of accumulating radiation over an extended time period.

It is another object of the invention to provide an improved dosimeter employing an electro-chemical integrating means to extend the time range over which radiation may be accumulated.

It is still another object of the invention to provide an improved dosimeter employing electro-chemical integrating means together with network compensation means for extending the dosage rate range over which a Geiger-Muller counter tube is capable of proportional detection.

It is a more particular object of the invention to provide a portable light weight dosimeter unit employing electro-chemical integration means and Geiger-Muller tube count rate compensation means to provide a dosimeter adapted to measure radiation dosages over extended time periods and at higher dosage rates.

Other objects and a fuller understanding of the invention may be had by referring to the following description, taken in conjunction with the accompanying drawings, in which:

FIGURES 1a and 1b together show a schematic diagram of a battery-operated dosimeter, incorporating an electro-chemical integrator and count rate compensation.

In brief, in the dosimeter of the invention, there is utilized an electro-chemical integrator to receive, integrate and store analog signals derived at the output of an electronic radiation detector or counter circuit utilizing, for example, a Geiger-Muller counter tube in which there is provided a compensation network which enhances the count rate frequency response capabilities of conventional Geiger-Muller counter tubes.

Referring now particularly to FIGURE 1a, power supply circuit 25 in general converts low voltage direct current (DC) into high voltage direct current suitable for powering a GM tube. More particularly, transistors 26 and 27 are interconnected through resistors 28, 29, 30 and 31, and capacitors 32 and 33, to operate in an astable oscillation mode. Transformer 34, with the primary thereof connected across the collectors of transistors 26 and 27, transforms low voltage oscillating current emanating from the astable multivibrator into a high voltage alternating current. The high voltage AC output derived from the secondary winding of transformer 34 is applied across a diode rectifying bridge comprised of diodes 35, 36, 37 and 38 for conversion into high voltage DC current. Battery 39, providing an input power for the power supply, is connected to the astable multivibrator through the center tap of the primary of transformer 34. The DC high voltage output of the supply circuit 25 appears between the interconnection of diode 36 with diode 37 and ground. Capacitor 45, together with the inductance of the primary winding, provides a resonant circuit designed to stabilize the astable multivibrator. Capacitor 40 provides the center tap of the primary winding of transformer 34 with an alternating current (AC) ground. The interconnected emitters of transistors 26 and 27 are attached to ground through variable resistor 41 to permit an adjustment of the power supply output voltage. The network comprised of resistor 42, neon tube 43, and capacitor 44 connected between the output of the diode bridge and ground provide for filtering of the output voltage of supply circuit 25.

Apparatus for detecting radiation quanta, e.g., gamma and/or X-ray photons to provide electrical output pulses, together with pulse-shaping circuitry shown enclosed within box 50, may include, for example, a Geiger-Muller (GM) tube 51, including an outer electrode connected to the negative high voltage output terminal of supply circuit 25, which is arranged to drive a Schmitt trigger circuit comprised of transistors 52 and 53; resistors 54, 55, 56, 57, 58, 59, 60 and 61; and capacitor 62. Interposed between the central electrode of GM tube 51 and the Schmitt trigger input are series-connected current-limiting resistor 63, an RC filter including capacitor 64 and resistor 65 between resistor 63 and ground, and a pulse differentiating network comprised of resistor 66 and capacitor 67 connected to the juncture of capacitor 64 and resistor 65, respectively. Set switch 68, which is normally open, provides for grounding the collector of transistor 53 on closure. Capacitor 69, serially connected between the rotary arm of potentiometer resistor element 61 and current-limiting resistor 70, transmits pulse signals derived from the Schmitt trigger to bus line 71, while sustaining the DC biasing mode of the Schmitt trigger circuit. Diode 72, connected in parallel with capacitor 69, provides for transmission of pulse signals from the Schmitt trigger to bus line 71, while isolating the output of the Schmitt trigger from associated circuitry.

The network comprised of resistors 73, 74 and 75, diode 76, and capacitor 77, connecting the output of GM tube 51 with bus line 71, senses an average current flow through GM tube 51 which is proportional to the count rate being detected. Also, this network adds a voltage proportional to the count rate to the signal emanating from the Schmitt trigger on bus line 71 so as to compensate for the drop off of detection efficiency of said GM tube at high radiation count rates, as described more fully hereinafter. Such network and the output from the Schmitt trigger accordingly provides an electrical signal output, i.e., from circuit 50, which is proportional to the radiation intensity impinging on the GM tube 51.

As a significant feature of the invention, an integrating and readout circuit 100, as shown in FIGURE 1b, which includes an electro-chemical itnegrating device 101, is arranged to receive and integrate the signal generated by detection circuit 50 and appearing on bus line 71. Also included in circuit 100 is readout meter 102, which is responsive to the output of integrating device 101.

At this point, a description of electro-chemical integrating device 101 will be of assistance in comprehension of the operation of the dosimeter. Such device is of a class of electro-chemical devices generically referred to as solions. In general, the integrating device 101 utilizes a reversible electro-chemical reaction in which the rate and extent of the reaction is controlled by an input signal current. For example, an active element medium such as iodine in solution will provide an iodine-to-iodide conversion and the reverse. By associated appropriate biasing circuitry and readout means, this device provides for integrating either a steady or pulsating DC input current by undergoing a chemical reaction in proportion to the quantity of input current as a measure of the amount of information introduced, storing this accumulated information in analog form, and outputting an integral of the amount of input information curent supplied to the device. For a detailed dscerption of the construction and operation of one such device 101, reference may be made to U.S. Patent No. 3,210,672, issued on Oct. 5, 1965 to James R. Cox et al.

As schematically illustrated in FIGURE 1b, integrating device 101 has associated therewith four electrodes: input electrode 103, shield electrode 104, readout electrode 105, and common electrode 106. A biasing network including battery 107 and voltage divider resistors 108 and 109 is connected between electrode 103 and electrode 104. Bus line 71, carrying the signal from the detector circuit 50, is attached to input electrode 103 of integrating device 101. To provide for re-setting of integrating device 101, resistor 110 and normally open re-set switch 111 are serially connected between the positive terminal of battery 39 and the junction of battery 107 and resistor 108. Common electrode 106 is attached to the positive terminal of battery 39.

Readout electrode 105 is electrically communicative with meter 102 through transistor 112 and current-limiting resistor 113. Diode 114 and resistor 115 connecting the base of transistor 112 to the positive terminal of battery 39 provides for biasing transistor 112 in a current-carrying mode. Serially arranged resistor 116 and battery 117, connecting electrode 106 with the base of transistor 112, essentially bias electrode 105 negatively with respect to common electrode 106. Battery 117 and resistor 116 may be eliminated if desired, but are preferably included to increase the long-term stability of electro-chemical integrating device 101.

Serially arranged resistor 118 and thermistor 119 are connected in parallel across resistor 113 in series with meter 102 to provide, together with resistor 113, temperature compensation for the electro-chemical integrator 101. This temperature compensation network, although not esential to the operability of the dosimeter, is preferably included in order to enhance the accuracy thereof.

Alarm circuit 125, shown in FIGURE 1b, includes a first amplifying means comprised of transistor 126 and biasing resistor 127. The input terminal of trigger means comprised of diode 127, tunnel diode 129, resistor 130 and silicon control rectifier (SCR) 131; is electrically communicative with the output of transistor 126 via resistor 127 and operates as a switch upon receipt of a critical current through the collector-emitter circuit of transistor 126. An astable multivibrator comprised of transistors 132 and 133; resistors 134, 135, 136, 137, 138 and 139; and capacitors 140 and 141 is arranged with the emitters of transistors 12 and 133 connected to the anode of SCR 131. The output of the multivibrator, derived from the collector circuit of the transistor 133, is connected to a second amplifying means, transistor 142, at the base thereof. Means, e.g., an audio transducer, adapted to convert the free-running oscillations of the astable multivibrator into an audible alarm signal, is serialy arranged within the collector-emitter circuit of transistor 142, to provide an audible signal from speaker 144 which is paralleled by capacitor 143.

In operation, power supply circuit 25 operates as a DC-to-DC converter in which battery 39 supplies a direct current input signal. The astable multivibrator, comprised of transistors 26 and 27, converts this DC source into an AC signal. Transformer 34 transforms the last mentioned signal into a high voltage AC potential, and the diode rectifying bridge comprised of diodes 35–38 converts this AC high voltage signal into a direct current high voltage supply. Resistor 42, neon tube 43 and capacitor 44 provides a filtering and voltage regulating network for the rectified source. It is noted that the particular power supply described herein operates from a low voltage DC source, and hence is preferable to other power supples where portability of the entire dosimeter is desired, i.e., battery-operated. However, this should not be viewed as a limitation on the scope of the invention, as numerous other power supplies capable of providing a high voltage, low current source are suitable in other applications.

Geiger-Muller counter tube 51, powered by the high voltage power supply 25, responds to incident radiation, e.g., gamma and X-ray radiation, and issues an output current pulse coincident with impingement of each quantum or photon of radiation thereon. Furthermore, there is an average current flow through tube 51 proportional to the average intensity of the radiation, i.e., correlative with the rate at which radiation photons impinge on the GM tube. (See page 109, Reference Data for Radio Engineers, Fourth Edition, IT&T Corporation, September 1963.)

These current pulse signals flow through serially connected resistor 63 and the filter network comprised of capacitor 64 and resistor 65, generating a negatively going voltage pulse at the junction of the latter two components. The differentiating network comprised of capacitor 67 and resistor 66 responds to each of these negative voltage pulses, and by differentiation, produces sequentially a negatively going pulse and a positive going pulse, i.e., a pair of opposingly polarized voltage spikes.

The Schmitt trigger, including transistors 52 and 53, is biased at the input thereof, i.e., base of transistor 52, to operate in a bistable state operating mode. Accordingly, upon receipt of a pulse oppositely polarized in respect to an immediately preceding pulse, the trigger switches state. (See page 168, Pulse and Digital Circuits, McGraw-Hill, New York, 1956.) Thus, each time the base of transistor 52 receives sequentially a negative pulse and a positive pulse provided by the response of GM tube 51 to a quantum of radiation, the trigger circuit produces at the rotary arm of resistor 61 a rectangular negative going pulse of uniform height and duration equal to the time separation of the adjacent input pulses, i.e., approximately the width of the negative voltage pulse output of GM tube 51.

It will be noted that for a series of random incident radiation quanta, the signal observed at the rotary arm of resistor 61 will be a chain of negatively going rectangular voltage pulses of uniform voltage height and duration, each presenting a quantized amount of electrical current corresponding to a single radiation quantum. Diode 72, paralleled by capacitor 60, permits the passage of this pulse chain as a pulsating DC current through current-limiting resistor 70 to bus line 71. Normally open set switch 68 allows the grounding of the collector of transistor 53 on closure thereof, and provides for the production of a constant negative voltage on bus line 71. Accordingly, switch 68 permits an operator to manually set readout meter 102 to a desired level by varying the storage of integrator 101.

It should be noted that other bistable switching circuits may be utilized in the alternative to the herein-described Schmitt trigger, such as a conventional bistable multivibrator. In general, the differentiating circuit and the Schmitt trigger provide for pulse-shaping of the output of GM tube 51 to provide uniformity in the coulombic current content in the pulses issuing therefrom. The Schmitt trigger is included in the preferred embodiment of the invention due to the symmetrical switching characteristics thereof, which accordingly enhances the accuracy of the unit.

Referring now to the network comprised of resistors 73, 75 and 74, capacitor 77 and diode 76, connecting the output of GM tube 51 with bus line 71. This circuit in general provides a means to compensate GM tube 51, and more particularly to monitor an average current flowing through tube 51 and to feed a current signal proportional thereto into bus line 71. The reason for employing this last mentioned network is to compensate for the characteristic fall off in the response of conventional GM tubes at higher rates or intensity of incident radiation within their designated range. For example, in an 18529 GM tube at $10^3$ roentgens per hour, the pulse output per second begins to exhibit a non-linear fall off in relation to incident radiation intensity. However, this same tube displays a proportionally increasing average current flow with incident radiation at $10^3$ roentgens per hour. Accordingly, this increased average current flow is utilized in the preferred embodiment of the invention to compensate for the fall off in pulse output response.

Particularly, as the current through resistors 73 and 75 increases with increasing radiation intensity, the voltage potential at the juncture of these resistors becomes negative, causing a negative voltage increment to appear on bus line 71. Resistor 74 acts as a current-limiting resistor, while capacitor 77 filters the voltage pulses concurrently appearing in the circuit due to the pulse output of GM tube 51. Diode 76, in a similar manner to diode 72, isolates this portion of the circuit from associated circuitry and supplies a unidirectional current increment to bus line 71.

It is noted at this point that bus line 71 receives outputs from both the pulse output signal of GM tube 51, i.e., from the Schmitt trigger, and the latter-discussed average current voltage output signal from GM tube 51, i.e., from the compensation network. Both of these signals appear on line 71 as additive negative voltages with respect to the common electrode 106 of integrator 101, and represent in analog form the instantaneous radiation intensity incident on GM tube 51.

Integration and readout circuit 100 performs the operation of integrating the current analog of the voltage signals appearing on bus line 71, storing this integrated quantity for later extraction of the information in terms related to the total accumulated dosage of radiation incident on the GM tube 51. The negative voltage applied across input electrodes 103 and common electrode 106 by means of bus line 71 generates a current flow in integrator 101. The integral of this current, i.e., the coulombic current equivalent correlative to radiation dosage, appears as a change in the resistance across readout electrode 105 and common electrode 106.

Battery 107, together with resistors 108 and 109, comprise a biasing network for integrator 101, permitting storage of information by correlative reaction in the active electro-chemical, e.g., iodine, element therein. Resistor 110 and re-set switch 111 provide for reversing the reaction of the electro-chemical element in integrator 101 to reduce the integral state thereof, i.e., lower the integral output of integrator 101 as represented by the resistance between electrodes 105 and 106.

Transistor 112 monitors the output of integrator 101, providing a current signal at the collector in proportion to the resistance between common electrode 106 and readout electrode 105. Battery 117 biases integrator 101 between electrodes 105 and 106 to provide stability of the stored electro-chemical state. It is noted that battery 117 is not essential to the operation of the dosimeter circuit, although it is included in the preferred embodiment of the invention to provide extended time stability of the storage characteristics thereof.

The current source output of transistor 112 drives meter 102 which is calibrated to the appropriate range of radiation by usual calibration methods, utilizing standard radiation sources or the like. Resistors 118 and 113, together with thermistor 119, temperature-compensate integrator 101 to enhance the accuracy of the unit over a wide range of temperature.

The alarm circuit 100 is responsive to the output of transistor 112, and accordingly monitors the integral state of integrator 101. More particularly, as the voltage across the base of transistor 126 reaches a preselected level, the output of transistor 126 switches the trigger means comprised of tunnel diode 129, diode 128, and SCR 131. The voltage drop across diode 128 provides added voltage to the valley characteristics of tunnel diode 129 to permit sufficient forward bias voltage to appear across SCR 131 upon switching of tunnel diode 129 to its high voltage state. Furthermore, diode 128 temperature-compensates SCR 131 to enhance the switching level stability thereof. Resistor 127 is selected to provide for actuation of the alarm circuit at any selected accumulated radiation dosage level.

The astable multivibrator comprised of transistors 132 and 133 is actuated into a free-running state upon conduction of SCR 131. Specifically, as SCR 131 is turned on in response to a critical or selected level of accumulated radiation dosage, the emitters of transistors 132 and 133 are essentially connected to ground, providing appropriate biasing for a free-running state of the astable multivibrator. The output of the astable multivibrator is amplified by a second amplifying means comprised of transistor 142. The collector-emitter circuit of transistor 142 in turn drives speaker 144. Resistor 134 provides for an adjustment of the RC time constants of the astable multivibrator, thus allowing for control of the frequency of oscillation thereof. Capacitor 143 forms a frequency compensation network for speaker 144.

Alternatively to the herein described astable multivibrator alarm circuit, any audio or visual alarm means responsive to the output of circuit 100 may, as desired, be utilized in the dosimeter. For example, it will be recognized by those skilled in the art that numerous conventional oscillator circuits adapted with an audio transducer output would be suitable for the subject alarm means.

To facilitate the reproduction of the preferred embodiment of this dosimeter, the following list of components is included. For these preselected values and components, a dosimeter capable of accumulating gamma radiation at rates of 0.5 roentgen per hour to 50 roentgens per hour to a total dose of 200 roentgens is provided. Furthermore, this embodiment will provide a unit capable of accumulating radiation dosage information over a period of at least several days, with exceptional accuracy.

*Component list*

Reference numeral—

| Capacitor: | Value |
| --- | --- |
| 32 | 1 µf. |
| 33 | 1 µf. |
| 45 | 1 µf. |
| 40 | 100 µf. |
| 44 | 22 µf. 600 v. |
| 64 | 820 pf. 1 kv. |

*Component list*—Continued

| | | |
|---|---|---|
| 67 | 100 pf. | |
| 62 | 510 pf. | |
| 77 | Selected with resistor 75 for maximum compensation. | |
| 140 | .01 μf. | |
| 141 | .01 μf. | |
| 143 | .02 μf. | |
| 69 | 100 pf. | |

Resistor:

| | |
|---|---|
| 28 | 20K ohms. |
| 29 | 100 ohms. |
| 30 | 100 ohms. |
| 31 | 20K ohms. |
| 41 | 10 ohms variable resistor. |
| 42 | 22 megohms. |
| 63 | 22 megohms. |
| 73 | 47K ohms. |
| 65 | 820K ohms. |
| 66 | 220K ohms. |
| 54 | 6.8K ohms. |
| 55 | 2.4K ohms. |
| 56 | 1K ohm. |
| 57 | 7.5K ohms. |
| 58 | 39 ohms. |
| 59 | 4.7K ohms. |
| 60 | 51 ohms. |
| 61 | 1K ohm potentiometer. |
| 70 | 3.3 megohms. |
| 108 | 10K ohms. |
| 109 | 4.7K ohms. |
| 115 | 4.7K ohms. |
| 116 | 1.5K ohms. |
| 118 | 510 ohms. |
| 119 | Thermistor, Fenwal 6B3242. |
| 113 | 20K ohms. |
| 127 | Selected for alarm triggering level. |
| 75 | Selected with capacitor 77 for maximum compensation. |
| 130 | 470 ohms. |
| 134 | 10K ohms potentiometer. |
| 135 | 1K ohm potentiometer. |
| 136 | 20K ohms. |
| 137 | 20K ohms. |
| 138 | 1K ohm. |
| 139 | 10K ohms. |
| 110 | 100K ohms. |
| 74 | 1 megohm. |

Transistors:

| | |
|---|---|
| 26, 27 | 2N2219. |
| 52, 53 | LED 21031. |
| 112 | 2N3251. |
| 126 | 2N2484. |
| 132, 133 | LED 21031. |
| 142 | 2N1309. |

Diodes:

| | |
|---|---|
| 35, 36, 37, 38 | IN 3283. |
| 72 | IN 3333. |
| 114 | IN 914. |
| 129 | IN 3713. |
| 128 | IN 995. |

SCR 131 — LED 21020.

Battery:

| | |
|---|---|
| 39 | 4 v. |
| 107 | 1.35 v. |
| 117 | 1.35 v. |

Transformer 34 — Micro tran. M 8070.
Neon tube 43 — Neon tube NE1.
Geiger-Muller tube 51 — 18529.
Electro-chemical integrating device 101 — Chemtron SE100, solion tetrode (self-organizing system, manufacturer).
Meter 102 — 0–100 μa. (calibrated to 0–200 roentgens).
Speaker 144 — 15 ohms coil.

Summarizing the operation of the dosimeter, power supply circuit 25, operating on a low voltage direct current source, provides a high voltage direct current supply for GM tube 51. In response to radiation incident on GM tube 51, the Schmitt trigger circuit produces a chain of rectangular negative going voltage pulses of generally uniform characteristics and of quantity in proportion to the intensity of radiation. This pulse chain appears on bus line 71 concurrently with the voltage output of the compensation network comprised of resistors 73, 75 and 74, capacitor 77 and diode 76. The output of the compensation network provides for enhanced linearity of the output of detection circuit 50 at high rates of radiation. These two output signals from detection circuit 50 are integrated and stored by electro-chemical integrator 101. The stored signal in analog form, representative of the accumulated radiation dose, is monitored by transistor 112 and read out on meter 102, calibrated in radiation units. Alarm circuit 125, responsive to a preselected critical level of accumulated radiation, produces an audible alarm signal when this level is reached.

Although I have described my invention in its preferred form with a degree of particularity, it is understood that the present disclosure of the preferred form has been made only by way of example. For instance, it is not essential that a Geiger-Muller tube be utilized as the detection means, as numerous other radiation detectors would provide a substitute therefor, such as gas-filled counters, in general, semiconductors and even scintillation crystal counters. Therefore, it is noted that numerous changes in the details of construction and the combination and arrangement of parts may be resorted to without departing from the spirit and scope of the invention as hereinafter claimed.

What is claimed is:

1. In an electrode dosimeter capable of use over extended time periods and wide radiation intensity ranges; the combination comprising:

(a) a Geiger-Muller counter tube means adapted to receive a power source; said tube means responsive to incident radiation and productive of electrical output pulses coincident with each quantum of said radiation, and furthermore productive of an average current flow proportionally increasing with the intensity of said radiation;

(b) electronic pulse shaping means to provide uniformity of electrical characteristics therebetween, said pulse shaping means including network compensation means electrically communicative with said tube means for sensing said average current flow and producing a compensation voltage proportional thereto;

(c) an electro-chemical integrating device, said device having an input electrode, a shield electrode, a readout electrode and a common electrode; means for biasing said shield electrode negatively with respect to said input electrode; said device arranged to receive across said input and common electrodes outputs of said pulse-shaping means and compensation means, whereby said device characteristically exhibits a change in resistance between said readout and common electrodes in proportion to the integral of said uniform voltage pulses and said compensation voltage; and (d) output means for monitoring the accumulation of said radiation being responsive to variations in the resistance between said readout electrode and said common electrode.

2. In the dosimeter recited in claim 1, wherein said compensation means is comprised of an R-C parallel network serially arranged with said tube; said network is selectively responsive to said average current flow; and productive of a compensation voltage proportional to said average current flow.

3. In the dosimeter recited in claim 2, wherein said pulse-shaping means comprises:
  (a) an R-C differentiating circuit associated with said Geiger-Muller tube means for differentiating said electrical output pulses thereof; providing a pair of opposingly polarized voltage spikes; and
  (b) a Schmitt trigger adapted to operate in a bistable mode; said trigger electrically communicative with an output of said circuit means whereby said trigger is productive of generally uniform rectangular shaped pulses in response to said voltage spikes.

4. The dosimeter recited in claim 3, further defined by said output means comprising:
  (a) an electronic circuit bistable switching means associated with said integrating device; said bistable switching means being responsive to said preselected resistance level between said readout and common electrodes of said integrating device;
  (b) a first astable multivibrator electrically communicative with said switching means adapted to operate in a free-running mode in response to said switching means and productive of an electrical oscillating output signal; and
  (c) audible signal means associated with said multivibrator; said audible signal means responsive to said oscillating output signal and productive of an audible alarm.

5. The dosimeter recited in claim 4, further including a DC-to-DC converter power supply comprising:
  (a) a second astable multivibrator, powered by a relatively low voltage direct current source and productive of an alternating current electrical signal;
  (b) a transformer having a low voltage primary winding; said primary winding driven by said multivibrator; and
  (c) rectifying means connected across said secondary winding of said transformer for converting an alternating current signal appearing thereon into a direct current relatively high voltage; said relatively high voltage providing said power source for said Geiger-Muller tube means.

References Cited

UNITED STATES PATENTS 3,210,672  10/1965  Cox et al. _____ 324—94

OTHER REFERENCES

Reference Data for Radio Engineers, 4th Ed., I.T.T. Corp., p. 914 (1956).

RALPH G. NILSON, *Primary Examiner.*

A. B. CROFT, *Assistant Examiner.*